United States Patent
Ishida et al.

(10) Patent No.: US 12,435,195 B2
(45) Date of Patent: Oct. 7, 2025

(54) SURFACE-MODIFIED FIBERS, REINFORCING FIBERS, AND MOLDED ARTICLE USING SAME

(71) Applicant: KURARAY CO., LTD., Kurashiki (JP)

(72) Inventors: Eiichi Ishida, Okayama (JP); Daisuke Koda, Kamisu (JP); Toru Asada, Okayama (JP); Shinichi Takemoto, Okayama (JP); Shuhei Yorimitsu, Okayama (JP); Hiroyuki Kawai, Okayama (JP)

(73) Assignee: KURARAY CO., LTD., Kurashiki (JP)

( * ) Notice: Subject to any disclaimer, the term of this patent is extended or adjusted under 35 U.S.C. 154(b) by 722 days.

(21) Appl. No.: 17/780,087

(22) PCT Filed: Nov. 10, 2020

(86) PCT No.: PCT/JP2020/041979
§ 371 (c)(1),
(2) Date: May 26, 2022

(87) PCT Pub. No.: WO2021/106559
PCT Pub. Date: Jun. 3, 2021

(65) Prior Publication Data
US 2022/0306822 A1     Sep. 29, 2022

(30) Foreign Application Priority Data
Nov. 27, 2019  (JP) ................... 2019-214432

(51) Int. Cl.
C08J 5/24       (2006.01)
C08L 7/00       (2006.01)
C08L 23/16      (2006.01)
D06M 15/356     (2006.01)

(52) U.S. Cl.
CPC ............ *C08J 5/248* (2021.05); *C08L 7/00* (2013.01); *C08L 23/16* (2013.01); *D06M 15/3562* (2013.01); *C08J 2307/00* (2013.01); *C08J 2323/16* (2013.01); *C08J 2409/06* (2013.01); *C08L 2205/16* (2013.01)

(58) Field of Classification Search
CPC ... C08J 5/24; C08L 23/16; C08L 7/00; D06M 15/356
USPC ........................................................ 523/222
See application file for complete search history.

(56) References Cited

U.S. PATENT DOCUMENTS

| | | | |
|---|---|---|---|
| 2007/0184264 A1 | 8/2007 | Masuda | |
| 2016/0177512 A1* | 6/2016 | Kawahara | C12M 23/20 162/158 |
| 2018/0079874 A1* | 3/2018 | Lallet | C08J 3/215 |

FOREIGN PATENT DOCUMENTS

| | | | | |
|---|---|---|---|---|
| EP | 3258006 B1 | 6/2019 | | |
| JP | S54-4976 A | 1/1979 | | |
| JP | S58-2370 A | 1/1983 | | |
| JP | S58-5777 B2 | 2/1983 | | |
| JP | H11-81075 A | 3/1999 | | |
| JP | 2011111563 A | 6/2011 | | |
| JP | 2017210704 A * | 11/2017 | .......... | D06M 13/292 |
| WO | WO-2006106972 A1 | 10/2006 | | |
| WO | WO-2016166483 A1 * | 10/2016 | .......... | B60C 1/0016 |
| WO | WO-2017057257 A1 | 4/2017 | | |

OTHER PUBLICATIONS https://matmake.com/properties/vapor-pressure-of-alcohols.html (Year: 2024).*
International Search Report issued Dec. 28, 2020 in PCT/JP2020/041979 (with English translation), 5 pages.
Extended European Search Report issued Dec. 11, 2023 in European Patent Application No. 20892099.1, 7 pages.

* cited by examiner

*Primary Examiner* — Deve V Hall
(74) *Attorney, Agent, or Firm* — Element IP, PLC

(57) ABSTRACT

To provide surface-modified fibers and reinforcing fibers that are capable of enhancing the adhesiveness to rubber, without the use of resorcinol and formaldehyde, and a molded article using the same. Surface-modified fibers include fibers, and a surface-modifying layer covering at least a part of a surface of the fibers, and have a solid surface zeta potential on a surface of the surface-modifying layer of −20.0 to 30.0 mV.

12 Claims, No Drawings

SURFACE-MODIFIED FIBERS, REINFORCING FIBERS, AND MOLDED ARTICLE USING SAME

TECHNICAL FIELD

The present invention relates to surface-modified fibers and reinforcing fibers excellent in adhesiveness to rubber, and a molded article using the same.

BACKGROUND ART

Synthetic organic fibers, such as polyethylene terephthalate (PET), nylon 66, vinylon, and rayon, are inexpensive, and simultaneously have a high strength, are excellent in heat resistance and durability, and have a light weight, and thus the fibers have been used as reinforcing fibers for automobile tires and brake oil hoses. In these products, for sufficiently exerting the excellent physical characteristics (for example, the high strength and the high elastic modulus) and the like of the rubber, it is necessary to adhere firmly the fibers and the rubber.

As a method for firmly adhering fibers and rubber, a method using an adhesive referred to as RFL containing a resorcinol-formaldehyde resin and a rubber latex as major components has been widely known (PTLs 1 and 2).

However, since formaldehyde contained in the RFL is suspected of carcinogenicity, and resorcinol is suspected of being an environmental endocrine-disrupting chemical, there is being a demand of an alternate material that does not use these raw materials.

As an alternate material of the RFL, for example, PTL 3 proposes a technique using an adhesive containing an adhesive compound having an unsaturated carbon bond and an epoxy group that reacts with a vulcanizing agent used for vulcanization of rubber. PTL 4 proposes a technique including the first step of providing an active functional group layer by applying a blocked isocyanate compound and an epoxy compound, and the second step of using an adhesive component containing a latex as a major component.

CITATION LIST

Patent Literatures

PTL 1: JP 54-4976 A
PTL 2: JP 58-2370 A
PTL 3: JP 2011-111563 A
PTL 4: European Patent No. 3,258,006

SUMMARY OF INVENTION

Technical Problem

The method using the adhesive described in PTL 3 has a problem of poor practicality due to the largely inferior adhesiveness as compared to the method using the ordinary RFL. The treatment described in PTL 4 requires a step of providing an intermediate layer referred to as a rubberized layer, and also requires a large amount of energy for the treatment since the treatment at a high temperature is necessarily performed in two stages, and furthermore the reinforcing capability may be deteriorated in some cases due to the concern of thermal deterioration of the fibers. PTL 4 describes only the technique using an adhesive component containing a latex as a major component, but does not describe about the use of an adhesive component containing conjugated diene-based rubber as a major component.

The present invention has been made in view of the problems of the background art, and an object thereof is to provide surface-modified fibers and reinforcing fibers that are capable of enhancing the adhesiveness to rubber, without the use of resorcinol and formaldehyde, and a molded article using the same.

Solution to Problem

As a result of the earnest investigations by the present inventors for achieving the object, it has been found that by attaching a particular compound to fibers and regulating the zeta potential of the fiber surface to a particular range, the affinity between the fibers and the adhesive component can be enhanced, and consequently the adhesiveness between the fibers and rubber can be enhanced without the use of resorcinol and formaldehyde, and thus the present invention has been completed.

The present invention relates to the following items [1] to [14].

[1] Surface-modified fibers including fibers, and a surface-modifying layer covering at least a part of a surface of the fibers, comprising a solid surface zeta potential on a surface of the surface-modifying layer of −20.0 to 30.0 mV.

[2] The surface-modified fibers according to the item [1], wherein the fibers are one or more kind of fibers selected from polyester-based fibers, polyamide-based fibers, polyvinyl alcohol-based fibers, and regenerated cellulose-based fibers.

[3] The surface-modified fibers according to the item [1] or [2], wherein the surface-modifying layer contains a compound comprising a nitrogen-containing functional group.

[4] The surface-modified fibers according to any one of the items [1] to [3], wherein the surface-modifying layer contains a compound comprising a functional group derived from one or more kind selected from an oxazoline group, an oxazolidinone group, a carbodiimide group, a carbamide group, an amino group, and an aziridine group.

[5] The surface-modified fibers according to any one of the items [1] to [4], wherein the surface-modified fibers have an amount of the surface-modifying layer of 0.01 to 5.0 parts by mass per 100 parts by mass of the fibers used as a raw material.

[6] Reinforcing fibers including the surface-modified fibers according to any one of the items [1] to [5], and an adhesive layer containing conjugated diene-based rubber covering at least a part of a surface of the surface-modified fibers.

[7] The reinforcing fibers according to the item [6], wherein the conjugated diene-based rubber has a number average molecular weight (Mn) of more than 2,000 and 120,000 or less.

[8] The reinforcing fibers according to the item [6] or [7], wherein the conjugated diene-based rubber has a monomer unit derived from one or more kind selected from butadiene, isoprene, and farnesene, in a molecule thereof.

[9] The reinforcing fibers according to any one of the items [6] to [8], wherein the conjugated diene-based rubber is modified conjugated diene-based rubber comprising a hydrogen bonding functional group in a part of conjugated diene-based rubber, and the hydrogen bonding functional group is one or more kind selected from a hydroxy group, an epoxy group, an aldehyde group, an acetalized form of an aldehyde group, a carboxy group, a salt of a carboxy group, an esterified form of a carboxy group, an acid anhydride of a carboxy group, a silanol group, an esterified form of a silanol group, an amino group, an imidazole group, and a mercapto group.

[10] The reinforcing fibers according to any one of the items [6] to [9], wherein the adhesive layer further contains an oil, and the oil has a vapor pressure at 20° C. of 10 Pa or less.

[11] A molded article including the reinforcing fibers according to any one of the items [6] to [10].

[12] The molded article according to the item [11], wherein the molded article further includes a rubber layer.

[13] The molded article according to the item [11] or [12], wherein the molded article is a tire, a belt, or a hose.

[14] A molded article including fibers, a surface-modifying layer, an adhesive layer, and a rubber layer in this order, comprising an adhesion force between the adhesive layer and the rubber layer of 70 N or more per a width of 25.4 mm.

Advantageous Effects of Invention

The present invention can provide surface-modified fibers and reinforcing fibers that are capable of enhancing the adhesiveness to rubber, without the use of resorcinol and formaldehyde, and a molded article using the same.

DESCRIPTION OF EMBODIMENTS

[Surface-Modified Fibers]

The surface-modified fibers of the present invention include fibers, and a surface-modifying layer covering at least a part of a surface of the fibers, and have a solid surface zeta potential on a surface of the surface-modifying layer of −20.0 to 30.0 mV.

According to the present invention, the zeta potential of the solid surface is regulated to the aforementioned range, and thereby strong affinity is exhibited between modified conjugated diene-based rubber contained in the adhesive component and the fibers. The fibers, the adhesive component, and the rubber are thus firmly adhered, and consequently the adhesiveness between the fibers and the rubber is enhanced.

In the present invention, the "surface-modifying layer covering at least a part of a surface of the fibers" may be an embodiment in which the surface-modifying layer exists in the form, for example, of a film or a layer, on at least a part of the surface of the fibers, and may be an embodiment in which the component corresponding to the surface-modifying layer is contained in the raw material of the fibers, and the component of the surface-modifying layer exists in a part of the surface of the fibers themselves.

From the standpoint of the enhancement of the affinity between the fibers and the adhesive component, thereby enhancing the adhesiveness between the fibers and the rubber consequently, the solid surface zeta potential on the surface of the surface-modifying layer is preferably −20.0 to 20.0 mV, more preferably −15.0 to 15.0 mV, further preferably −10.0 to 12.0 mV, still further preferably −5.0 to 10.0 mV, still more further preferably −5.0 to 9.0 mV, yet further preferably −5.0 to 6.0 mV, and yet more further preferably −5.0 to 0 mV.

<Surface-Modifying Layer>

The surface-modifying layer in the present invention is not particularly limited, as far as the surface-modifying layer is constituted by a compound capable of regulating the solid surface zeta potential to the aforementioned range, and for example, is preferably a layer containing a compound having a nitrogen-containing functional group, and specifically preferably a layer containing a compound having a functional group derived from one or more kind selected from an oxazoline group, an oxazolidinone group, a carbodiimide group, a carbamide group, an amino group, and an aziridine group.

Examples of the compound having the functional group include an oxazolidinone group-containing compound obtained by reacting a blocked isocyanate compound and an epoxy compound, an oxazoline group-containing compound obtained by introducing an oxazoline group to a polymer main chain of an acrylic polymer or styrene-acrylic copolymer, a carbodiimide group-containing compound obtained by introducing a carbodiimide group to a molecule (polyfunctional carbodiimide), a carbamide group-containing compound, such as a urea derivative, an amino group-containing polymer obtained by introducing an amino group to a molecule, and an aziridine group-containing compound obtained by introducing an aziridine group to a molecular end (e.g., 2,2-bis(hydroxymethyl)butanol tris[3-(1-aziridinyl)propionate]), among which an oxazolidinone group-containing compound obtained by reacting a blocked isocyanate compound and an epoxy compound is preferred from the standpoint of the enhancement of the adhesiveness between the surface-modified fibers and the rubber, and an oxazoline group-containing compound is preferred from the standpoint of the reduction of the environmental load.

The surface-modifying layer preferably covers the entire surface of the fibers from the standpoint of the enhancement of the adhesiveness to the rubber, and practically may cover at least a part of the surface of the fibers. The amount of the surface-modifying layer covering the surface of the fibers is specifically preferably 0.01 to 5.0 parts by mass, more preferably 0.05 to 1.0 part by mass, and further preferably 0.1 to 0.3 part by mass, per 100 parts by mass of the fibers used as the raw material.

<Fibers>

The fibers used in the surface-modified fibers of the present invention are not particularly limited, and hydrophobic fibers formed of a hydrophobic resin, which have not been able to adhere firmly to rubber by the ordinary techniques, are preferably used. Hydrophobic fibers generally have no polar functional group on the surface of the fibers, and have not been able to adhere firmly to rubber due to the poor affinity to the adhesive component described later. However, the surface-modifying layer provided on the surface of the fibers as in the present invention enables the firm adhesion to rubber even with hydrophobic fibers. The "fibers" referred in the present invention encompass not only single fibers and long fibers, but also such embodiments as a nonwoven fabric, a woven fabric, a knitted fabric, a felt fabric, and sponge.

Examples of the hydrophobic fibers that can be used in the present invention include polyolefin-based fibers, such as polyethylene and polypropylene, polyester-based fibers, such as polyethylene terephthalate, and wholly aromatic polyester-based fibers, and among these, polyester-based fibers are preferred due to manufacturing cost, the excellent strength, heat resistance, durability, and the like thereof.

Hydrophilic fibers may also be used in the present invention. Examples of the hydrophilic synthetic fibers include synthetic fibers constituted by a thermoplastic resin having a hydrophilic functional group, such as a hydroxy group, a carboxy group, a sulfonic acid group, and an amino group, and/or a hydrophilic bond, such as an amide bond.

Specific examples of the thermoplastic resin include a polyvinyl alcohol-based resin, a polyamide-based resin (for example, an aliphatic polyamide, such as polyamide 6, polyamide 66, polyamide 11, polyamide 12, polyamide 610, polyamide 612, and polyamide 9C (i.e., a polyamide formed of nonanediamine and cyclohexanecarboxylic acid); a semi-aromatic polyamide synthesized from an aromatic dicarboxylic acid, such as polyamide 9T (i.e., a polyamide formed of nonanediamine and terephthalic acid), and an aliphatic diamine; and a wholly aromatic polyamide synthesized from an aromatic dicarboxylic acid, such as poly-p-phenylene terephthalamide, and an aromatic diamine), and a polyacrylamide-based resin.

Among these, a polyvinyl alcohol-based resin and a polyamide-based resin are preferred. One kind of the hydrophilic synthetic fibers may be used alone, or two or more kinds thereof may be used in combination. The hydrophilic synthetic fibers may be subjected to a hydrophilic treatment described later for further enhancing the hydrophilicity thereof.

Examples of the hydrophilic natural fibers include natural cellulose fibers, for example, wood pulp, such as kraft pulp, and non-wood pulp, such as cotton pulp and straw pulp.

Examples of the hydrophilic regenerated fibers include regenerated cellulose fibers, such as rayon, lyocell, cupra, and polynosic.

One kind of these natural fibers and regenerated fibers may be used alone, or two or more kinds thereof may be used in combination. These hydrophilic natural fibers and regenerated fibers may be subjected to a hydrophilic treatment described later for further enhancing the hydrophilicity thereof.

It suffices that the hydrophilic fibers have hydrophilicity at least on the surface thereof, and for example, the hydrophilic fibers may be fibers obtained by subjecting the surface of hydrophobic fibers to a hydrophilic treatment, a core-shell type composite fibers including a hydrophobic resin as the core and a hydrophilic resin as the shell, or the like. For the hydrophilic resin constituting the shell, reference may be made to the description relating to the hydrophilic synthetic fibers. Examples of the hydrophobic fibers formed of the hydrophobic resin include the hydrophobic fibers described above.

The hydrophilic treatment is not particularly limited, as far as the treatment chemically or physically imparts a hydrophilic functional group to the surface of fibers, and may be performed, for example, by a method of modifying the hydrophobic fibers formed of the hydrophobic resin with a compound containing a hydrophilic functional group, such as an isocyanate group, an epoxy group, a hydroxy group, an amino group, an ether group, an aldehyde group, a carbonyl group, a carboxyl group, and a urethane group, or a derivative thereof, a method of modifying the surface through electron beam irradiation, or the like.

The hydrophilic fibers used in the present invention are preferably synthetic fibers or regenerated fibers from the standpoint of the use as reinforcing fibers, and among these, one or more kind of fibers selected from polyester-based fibers, a polyamide-based fibers, a polyvinyl alcohol-based fibers, and regenerated cellulose-based fibers are preferred.

In the present invention, one kind of the fibers may be used alone, or two or more kinds thereof may be used in combination.

<Production Method of Surface-Modified Fibers>

The production method of the surface-modified fibers of the present invention is not particularly limited, and the surface-modified fibers can be produced by a method of preparing a solution of a compound constituting the surface-modifying layer with water or an organic solvent, attaching the solution to the fibers, and then drying the solution by a heat treatment or the like.

The method of attaching the solution of the surface modifier to the fibers is not particularly limited, and may be performed by one or more kind selected from immersion, a roll coater, an oiling roller, an oiling guide, nozzle (spray) coating, brush coating, and the like.

The heat treatment for drying the solution is preferably performed at a treatment temperature of 100 to 250° C. for a treatment time of 0.1 second to 2 minutes. The heat treatment may be performed only once at a particular temperature, or may be twice or more at different treatment temperatures for different treatment times.

The surface-modifying layer may contain an additional component other than as described above. Examples of the additional component include a crosslinking agent, an acid, a base, an inorganic salt, an organic salt, a pigment, a dye, an antioxidant, a polymerization initiator, and a plasticizer.

In the case where the surface-modifying layer contains the additional component, the content of the additional component in the surface-modifying layer is preferably 20% by mass or less, more preferably 10% by mass or less, and further preferably 5% by mass or less, from the standpoint of the enhancement of the adhesion force to rubber.

[Reinforcing Fibers]

The reinforcing fibers of the present invention include the surface-modified fibers of the present invention, and an adhesive layer containing conjugated diene-based rubber covering at least a part of the surface of the surface-modified fibers. In the present invention, the fibers and the adhesive layer, and the adhesive layer and the rubber each can be firmly adhered due to the high affinity between the surface-modified fibers and the adhesive layer.

While the reinforcing fibers of the present invention may be covered with the adhesive layer over the entire surface of the surface-modified fibers, it suffices that at least a part thereof is covered with the adhesive layer, examples of which include embodiment in which the adhesive component exists in the form of a film or a layer.

The adhesive layer of the present invention can provide the reinforcing fibers excellent in adhesiveness to rubber even though formaldehyde harmful to human bodies or a resin obtained from formaldehyde as a raw material is not contained. In the present invention, assuming that the adhesive layer contains a resin obtained from formaldehyde as a raw material, examples of the resin include a resorcinol-formaldehyde resin, a phenol-formaldehyde resin, a melamine-formaldehyde resin, and derivatives thereof. In the case where the adhesive layer contains the formaldehyde component, the content thereof is preferably 10 parts by mass or less, more preferably 5 parts by mass or less, further preferably 3 parts by mass or less, and still further preferably 1 part by mass or less, per 100 parts by mass of the conjugated diene-based rubber, and it is particularly preferred that substantially no formaldehyde component is contained. The content of formaldehyde can be measured with HPLC or the like after extracting the adhesive layer from the reinforcing fibers with a solvent, such as toluene.

<Adhesive Layer>

The adhesive layer in the reinforcing fibers of the present invention is not particularly limited, as far as conjugated diene-based rubber is contained therein, for example, and may be formed by attaching an adhesive component formed of a solution obtained by dissolving the conjugated diene-based rubber in an oil, or an adhesive component formed of an emulsion obtained by dispersing the conjugated diene-based rubber in water, to the surface-modified fibers. Embodiments of the adhesive layer will be specifically described below.

[Conjugated Diene-Based Rubber]

The conjugated diene-based rubber used in the present invention contains a monomer unit derived from a conjugated diene (which may be hereinafter referred to as a "conjugated diene unit") in the molecule thereof, and is preferably, for example, the conjugated diene-based rubber containing a monomer unit derived from a conjugated diene in an amount of 50% by mol or more based on the total monomer units in the conjugated diene-based rubber.

Examples of the conjugated diene monomer include butadiene, 2-methyl-1,3-butadiene (which may be hereinafter referred to as "isoprene"), 2,3-dimethylbutadiene, 2-phenylbutadiene, 1,3-pentadiene, 2-methyl-1,3-pentadiene, 1,3-hexathene, 1,3-octadiene, 1,3-cyclohexathene, 2-methyl-1,3-octathene, 1,3,7-octatriene, β-farnesene (which may be hereinafter referred to as "farnesene"), myrcene, and chloroprene. One kind of the conjugated diene may be used alone, or two or more kinds thereof may be used in combination. The conjugated diene-based rubber more preferably contains a monomer unit derived from one or more kind selected from butadiene, isoprene, and farnesene, from the standpoint of the reactivity in vulcanization.

The conjugated diene-based rubber used in the present invention may contain a unit derived from an additional monomer other than the conjugated diene monomer in such an extent that does not impair the adhesion. Examples of the additional monomer include an ethylenic unsaturated monomer and an aromatic vinyl compound that can be polymerized therewith.

Examples of the ethylenic unsaturated monomer include an olefin, such as ethylene, 1-butene, and isobutylene.

Examples of the aromatic vinyl compound include styrene, α-methylstyrene, 2-methylstyrene, 3-methylstyrene, 4-methylstyrene, 4-propylstyrene, 4-t-butylstyrene, 4-cyclohexylstyrene, 4-dodecylstyrene, 2,4-dimethylstyrene, 2,4-diisopropylstyrene, 2,4,6-trimethylstyrene, 2-ethyl-4-benzylstyrene, 4-(phenylbutyl)styrene, 1-vinylnaphthalene, 2-vinylnaphthalene, vinylanthracene, N,N-diethyl-4-aminoethylstyrene, vinylpyridine, 4-methoxystyrene, monochlorostyrene, dichlorostyrene, and divinylbenzene. One kind thereof may be used alone, or two or more kinds thereof may be used in combination.

In the case where the conjugated diene-based rubber contains a monomer unit derived from the additional monomer other than the conjugated diene monomer, the content thereof is preferably 30% by mol or less, more preferably 10% by mol or less, and further preferably 5% by mol or less.

The conjugated diene-based rubber used in the present invention is preferably modified conjugated diene-based rubber having a hydrogen bonding functional group in a part of the conjugated diene-based rubber, and more preferably modified conjugated diene-based rubber containing the conjugated diene unit in at least a part of the polymer chain and having a hydrogen bonding functional group in a side chain or an end of the polymer chain.

In the case where the modified conjugated diene-based rubber is used as the conjugated diene-based rubber, the modified conjugated diene-based rubber interacts with the rubber and the surface-modified fibers as the adherends, so as to adhere the adherends. In the case where the modified conjugated diene-based rubber and the adherend rubber are vulcanized to form covalent bonding, the adhesiveness is further enhanced through the formation of strong cohesion force.

It is also considered that the hydrogen bonding functional group contained in the modified conjugated diene-based rubber forms a hydrogen bond to the surface-modifying layer of the surface-modified fibers, so as to enhance the adhesiveness.

The "hydrogen bond" referred in the description herein means a bonding interaction to be formed between a hydrogen atom (donor) that is bonded to an atom having a large electronegativity (e.g., O, N, and S) and is polarized to be electrically positivity, and an electrically negative atom (acceptor) having a lone electron pair.

In the present invention, the "hydrogen bonding functional group" is a functional group that functions as a donor and an acceptor in the hydrogen bond. Specific examples thereof include a hydroxy group, an epoxy group, an ether group, a mercapto group, a carboxy group, a carbonyl group, an aldehyde group, an amino group, an imino group, an imidazole group, a urethane group, an amide group, a urea group, an isocyanate group, a nitrile group, a silanol group, and derivatives thereof. Examples of the derivative of an aldehyde group include an acetalized form thereof. Examples of the derivative of a carboxy group include a salt thereof, an esterified form thereof, an amidated form thereof, and an acid anhydride thereof. Examples of the derivative of a silanol group include an esterified form thereof. Examples of the carboxy group include a group derived from a monocarboxylic acid and a group derived from a dicarboxylic acid. Among these, one or more kind selected from a hydroxy group, an epoxy group, an aldehyde group, an acetalized form an aldehyde group, a carboxy group, a salt of a carboxy group, an esterified form of a carboxy group, an acid anhydride of a carboxy group, a silanol group, an esterified form of a silanol group, an amino group, an imidazole group, and a mercapto group is preferred.

Among these, one or more kind selected from a hydroxy group, a carboxy group, a carbonyl group, a salt of a carboxy group, an esterified form of a carboxy group, and an acid anhydride of a carboxy group is preferred, one or more kind selected from a carboxy group, an esterified form of a carboxy group, and an acid anhydride of a carboxy group is more preferred, and functional groups derived from an esterified form of maleic anhydride and maleic anhydride are further preferred, from the standpoint of the enhancement of the adhesiveness and the standpoint of the production easiness of the conjugated diene-based rubber.

The number of the hydrogen bonding functional group in the modified conjugated diene-based rubber is preferably 1 or more, more preferably 3 or more, and further preferably 4 or more, in terms of average per one molecule, from the standpoint of the achievement of the reinforcing fibers excellent in adhesiveness to rubber. The number of the hydrogen bonding functional group is preferably 80 or less, more preferably 40 or less, further preferably 30 or less, still further preferably 20 or less, and still more further preferably 15 or less, in terms of average per one molecule, from the standpoint of the enhancement of the handleability by controlling the viscosity of the modified conjugated diene-based rubber to a suitable range.

The average number of the hydrogen bonding functional group per one molecule of the modified conjugated diene-based rubber is calculated from the equivalent (g/eq) of the hydrogen bonding functional group of the modified conjugated diene-based rubber and the styrene conversion number average molecular weight Mn thereof, according to the following expression. The equivalent of the hydrogen bonding functional group of the modified conjugated diene-based rubber means the mass of the conjugated diene and the additional monomer contained depending on necessity other than the conjugated diene, bonded to one hydrogen bonding functional group.

> Average number of hydrogen bonding functional group per one molecule=[(number average molecular weight (Mn))/(molecular weight of styrene unit)×(average molecular weight of conjugated diene and additional monomer unit contained depending on necessity other than conjugated diene)]/(equivalent of hydrogen bonding functional group)

The method for calculating the equivalent of the hydrogen bonding functional group may be appropriately selected depending on the kind of the hydrogen bonding functional group.

Examples of the method for producing the modified conjugated diene-based rubber include a method of adding a modifying compound to a polymerization product of a conjugated diene monomer (which may be hereinafter referred to as a "production method (1)"), a method of oxidizing a conjugated diene polymer (which may be hereinafter referred to as a "production method (2)"), a method of copolymerizing a conjugated diene monomer and a radically polymerizable compound having a hydrogen bonding functional group (which may be hereinafter referred to as a "production method (3)"), and a method of adding a modifying compound capable of reacting with the polymerization active end of a polymerization product of an unmodified conjugated diene monomer having a polymerization active end, to the polymerization product, before adding a polymerization terminator thereto (which may be hereinafter referred to as a "production method (4)"). Among these, from the standpoint of productivity, the modified conjugated diene-based rubber is preferably produced by the production method (1), (2), or (3), more preferably produced by the production method (1) or (3), and further preferably produced by the production method (1).

[Production Method (1) for Modified Conjugated Diene-Based Rubber]

The production method (1) is a method of adding a modifying compound to a polymerization product of a conjugated diene monomer, i.e., a conjugated diene-based rubber having not been modified (which may be hereinafter referred to as an "unmodified conjugated diene-based rubber").

The unmodified conjugated diene-based rubber can be prepared by polymerizing a conjugated diene, and depending on necessity an additional monomer other than the conjugated diene, for example, by an emulsion polymerization method, a solution polymerization method, or the like.

A known method or a method equivalent to the known method may be applied to the solution polymerization method. For example, a prescribed amount of a monomer containing a conjugated diene may be polymerized in a solvent with a Ziegler-based catalyst, a metallocene-based catalyst, or an active metal or an active metal compound capable of performing anion polymerization, in the presence of a polar compound depending on necessity.

Examples of the solvent include an aliphatic hydrocarbon, such as n-butane, n-pentane, isopentane, n-hexane, n-heptane, and isooctane; an alicyclic hydrocarbon, such as cyclopentane, cyclohexane, and methylcyclohexane; and an aromatic hydrocarbon, such as benzene, toluene, and xylene.

Examples of the active metal capable of performing anion polymerization include an alkali metal, such as lithium, sodium, and potassium; an alkaline earth metal, such as beryllium, magnesium, calcium, strontium, and barium; and a lanthanoid series rare earth element, such as lanthanum and neodymium. In the active metal capable of performing anion polymerization, an alkali metal and an alkaline earth metal are preferred, and an alkali metal is more preferred.

The active metal compound capable of performing anion polymerization is preferably an organic alkali metal compound. Examples of the organic alkali metal compound include an organic monolithium compound, such as methyllithium, ethyllithium, n-butyllithium, sec-butyllithium, t-butyllithium, hexyllithium, phenyllithium, and stilbenelithium; a polyfunctional organic lithium compound, such as dilithiomethane, dilithionaphthalene, 1,4-dilithiobutane, 1,4-dilithio-2-ethylcyclohexane, and 1,3,5-trilithiobenzene; sodium naphthalene, and potassium naphthalene. In the organic alkali metal compound, an organic lithium compound is preferred, and an organic monolithium compound is more preferred.

The amount of the organic alkali metal compound used may be appropriately determined depending on the melt viscosity, the molecular weight, and the like of the target unmodified conjugated diene-based rubber and the target modified conjugated diene-based rubber, and the organic alkali metal compound may be generally used in an amount of 0.01 to 3 parts by mass per 100 parts by mass in total of the monomer containing the conjugated diene.

The organic alkali metal compound may be used in the form of an organic alkali metal amide after reacting with a secondary amine, such as dibutylamine, dihexylamine, or dibenzylamine.

The polar compound is generally used for preventing the reaction from being deactivated and for regulating the microstructure of the conjugated diene moiety. Examples of the polar compound include an ether compound, such as dibutyl ether, tetrahydrofuran, ethylene glycol diethyl ether, and 2,2-di(2-tetrahydrofuryl)propane; a tertiary amine, such as tetramethylethylenediamine and trimethylamine; an alkali metal alkoxide, and a phosphine compound. The polar compound is generally used in an amount of 0.01 to 1,000 mol based on the organic alkali metal compound.

The temperature of the solution polymerization is generally in a range of −80 to 150° C., preferably in a range of 0 to 100° C., and more preferably in a range of 10 to 90° C. The polymerization mode may be any of a batch system and a continuous system.

The polymerization reaction can be terminated by adding a polymerization terminator. Examples of the polymerization terminator include an alcohol, such as methanol and isopropanol. The unmodified conjugated diene-based rubber can be isolated by pouring the resulting polymerization reaction liquid to a poor solvent, such as methanol, to deposit the polymerization product, or by washing the polymerization reaction liquid with water, followed by isolating and drying.

The production method of the unmodified conjugated diene-based rubber is preferably the solution polymerization method among the above.

A known method or a method equivalent to the known method may be applied to the emulsion polymerization method. For example, a prescribed amount of a monomer containing a conjugated diene is emulsified in the presence of an emulsifier and subjected to emulsion polymerization in the presence of a radical polymerization initiator.

Examples of the emulsifier include a long-chain fatty acid salt having 10 or more carbon atoms, and a rosin acid salt. Examples of the long-chain fatty acid salt include a potassium salt and a sodium salt of a fatty acid, such as capric acid, lauric acid, myristic acid, palmitic acid, oleic acid, and stearic acid.

The dispersion solvent used is generally water, and may contain a water soluble organic solvent, such as methanol or ethanol, within a range that does not impair the stability during the polymerization.

Examples of the radical polymerization initiator include a persulfate, such as ammonium persulfate and potassium persulfate, an organic peroxide, and hydrogen peroxide.

A chain transfer agent may be used for controlling the molecular weight of the resulting unmodified conjugated diene-based rubber. Examples of the chain transfer agent include a mercaptan compound, such as t-dodecylmercaptan and n-dodecylmercaptan; carbon tetrachloride, thioglycolic acid, diterpene, terpinolene, γ-terpinene, and α-methylstyrene dimer.

The temperature of the emulsion polymerization may be appropriately determined depending on the kind of the radical polymerization initiator used and the like, and is generally in a range of 0 to 100° C., and preferably in a range of 0 to 60° C. The polymerization mode may be any of continuous polymerization and batch polymerization.

The polymerization reaction can be terminated by adding a polymerization terminator. Examples of the polymerization terminator include an amine compound, such as isopropylhydroxylamine, diethylhydroxylamine, and hydroxylamine; a quinone-based compound, such as hydroquinone and benzoquinone, and sodium nitrite.

After terminating the polymerization reaction, an antiaging agent may be added depending on necessity. After terminating the polymerization reaction, the unreacted monomer is removed from the resulting latex depending on necessity, and then a salt, such as sodium chloride, calcium chloride, or potassium chloride, is added as a coagulant, while adding an acid, such as nitric acid or sulfuric acid, for controlling the pH of the coagulation system to a prescribed value depending on necessity, so as to coagulate the polymerization product, from which the dispersion solvent is removed to recover the polymerization product. Subsequently, the polymerization product is washed with water, dehydrated, and then dried to provide the unmodified conjugated diene-based rubber. In the coagulation, the latex may be mixed in advance with an extension oil in the form of an emulsion dispersion liquid, so as to recover the extended unmodified conjugated diene-based rubber.

(Modifying Compound used in Production Method (1))

The modifying compound used in the production method (1) is not particularly limited, and is preferably a compound having a hydrogen bonding functional group from the standpoint of the enhancement of the adhesiveness of the reinforcing fibers. Examples of the hydrogen bonding functional group include the same ones as described above. Among these, an amino group, an imidazole group, a urea group, a hydroxy group, an epoxy group, a mercapto group, a silanol group, an aldehyde group, a carboxy group, and derivatives thereof are preferred from the standpoint the strength of the hydrogen bonding force. The derivative of a carboxy group is preferably a salt thereof, an esterified form thereof, an amidated form thereof, or an acid anhydride thereof. One kind of the modifying compound having a hydrogen bonding functional group may be used alone, or two or more kinds thereof may be used in combination.

Examples of the modifying compound include an unsaturated carboxylic acid, such as maleic acid, fumaric acid, citraconic acid, and itaconic acid; an unsaturated carboxylic acid anhydride, such as maleic anhydride, citraconic anhydride, 2,3-dimethylmaleic anhydride, and itaconic anhydride; an unsaturated carboxylate ester, such as a maleate ester, a fumarate ester, a citraconate ester, and an itaconate ester; an unsaturated carboxylic acid amide, such as maleic acid amide, fumaric acid amide, citraconic acid amide, and itaconic acid amide; an unsaturated carboxylic acid imide, such as maleic acid imide, fumaric acid imide, citraconic acid imide, and itaconic acid imide; and a silane compound, such as vinyltrimethoxysilane, γ-methacryloxypropyltrimethoxysilane, mercaptomethylmethyldiethoxysilane, mercaptomethyltriethoxysilane, 2-mercaptoethyltrimethoxysilane, 2-mercaptoethyltriethoxysilane, 2-mercaptoethylmethoxydimethylsilane, 2-mercaptoethylethoxydimethylsilane, 3-mercaptopropyltrimethoxysilane, 3-mercaptopropyltriethoxysilane, 3-mercaptopropyldimethoxymethylsilane, 3-mercaptopropyldiethoxymethylsilane, 3-mercaptopropyldimethoxyethylsilane, 3-mercaptopropyldiethoxyethylsilane, 3-mercaptopropylmethoxydimethylsilane, and 3-mercaptopropylethoxydimethylsilane.

The amount of the modifying compound used is preferably 0.1 to 100 parts by mass, more preferably in a range of 0.5 to 50 parts by mass, and further preferably 1 to 30 parts by mass, per 100 parts by mass of the unmodified conjugated diene-based rubber.

The reaction temperature is generally preferably in a range of 0 to 200° C., and more preferably in a range of 50 to 200° C.

After the modifying compound is grafted to the unmodified conjugated diene-based rubber to introduce a hydrogen-bonding functional group thereinto, a further modifying compound capable of reacting with the functional group may be added to introduce another hydrogen bonding functional group into the polymer. Specific examples thereof include a method of grafting a maleic anhydride to an unmodified conjugated diene-based rubber prepared through living anion polymerization, and then reacting a compound, such as a compound having a hydroxy group, e.g., 2-hydroxyethyl methacrylate and methanol, or water.

The amount of the modifying compound added to the modified conjugated diene-based rubber is preferably 0.5 to 40 parts by mass, more preferably 1 to 30 parts by mass, further preferably 1.5 to 20 parts by mass, per 100 parts by mass of the unmodified conjugated diene-based rubber. The amount of the modifying compound added to the modified conjugated diene-based rubber can be calculated based on the acid value of the modifying compound, or can also be determined using various analyzers for infrared spectrometry, nuclear magnetic resonance spectrometry, or the like.

The method of adding the modifying compound to the unmodified conjugated diene-based rubber is not particularly limited, and examples thereof include a method of adding one or more kind of the modifying compound selected from the unsaturated carboxylic acid, the unsaturated carboxylic acid derivative, the silane compound, and the like and depending on necessity, a radical generator, to the unmodified conjugated diene-based rubber in the form of liquid, and heating the mixture in the presence or absence of an organic solvent. The radical generator used is not particularly limited, and may be an organic peroxide, an azo compound, hydrogen peroxide, and the like, which are ordinarily commercially available.

Examples of the organic solvent used in the method generally include a hydrocarbon solvent and a halogenated hydrocarbon solvent. Among these organic solvents, a hydrocarbon solvent, such as n-butane, n-hexane, n-heptane, cyclohexane, benzene, toluene, and xylene, is preferred.

An antiaging agent may be added in performing the reaction of adding the modifying compound in the aforementioned method from the standpoint of the prevention of side reaction. The antiaging agent used may be an ordinarily commercially available compound, and examples thereof include butylated hydroxytoluene (BHT), and N-phenyl-N'-(1,3-dimethylbutyl)-p-phenylenediamine (Nocrac 6C).

The amount of the antiaging agent added is preferably 0.01 to 10 parts by mass, more preferably 0.05 to 5 parts by mass, per 100 parts by mass of the unmodified conjugated diene-based rubber. In the case where the amount of the antiaging agent added is in the range, the side reaction can be suppressed to provide the modified conjugated diene-based rubber with high yield.

[Physical Properties of Conjugated Diene-based Rubber]

The weight average molecular weight (Mw) of the conjugated diene-based rubber is not particularly limited, is preferably more than 2,000, more preferably 5,000 or more, further preferably 10,000 or more, still further preferably 15,000 or more, still more further preferably 20,000 or more, and particularly preferably 25,000 or more, from the standpoint of the enhancement of the adhesiveness, and is preferably 120,000 or less, more preferably 100,000 or less, further preferably 75,000 or less, and still further preferably 55,000 or less, from the standpoint of the handleability.

The number average molecular weight (Mn) of the conjugated diene-based rubber is not particularly limited, is preferably more than 2,000, more preferably 5,000 or more, further preferably 10,000 or more, still further preferably 15,000 or more, still more further preferably 20,000 or more, and particularly preferably 25,000 or more, from the standpoint of the enhancement of the adhesiveness, and is preferably 120,000 or less, more preferably 75,000 or less, further preferably 50,000 or less, and still further preferably 47,000 or less, from the standpoint of the handleability.

The values of Mw and Mn of the conjugated diene-based rubber are polystyrene conversion values of the weight average molecular weight and the number average molecular weight obtained from the measurement with gel permeation chromatography (GPC), and specifically may be measured by the method described in the examples.

The molecular weight distribution (Mw/Mn) of the conjugated diene-based rubber is preferably 1.00 to 5.00, more preferably 1.00 to 3.00, further preferably 1.00 to 2.00, still further preferably 1.00 to 1.50, and particularly preferably 1.00 to 1.30. In the case where Mw/Mn is in the range, the fluctuation in viscosity of the conjugated diene-based rubber is small, resulting in good handleability. The molecular weight distribution (Mw/Mn) means the ratio of polystyrene conversion values (weight average molecular weight (Mw))/(number average molecular weight (Mn)) obtained from the measurement with GPC.

The conjugated diene-based rubber is preferably in the form of liquid from the standpoint of the adhesiveness between the conjugated diene-based rubber and the fibers.

In the description herein, the "form of liquid" means that the melt viscosity of the conjugated diene-based rubber measured at 38° C. is 4,000 Pa·s or less. The melt viscosity is preferably 0.1 Pa s or more, more preferably 1 Pa·s or more, further preferably 10 Pa·s or more, still further preferably 30 Pa·s or more, and still more further preferably 50 Pa s or more, from the standpoint of the enhancement of the adhesiveness, and is preferably 2,500 Pa s or less, and more preferably 2,100 Pa·s or less, from the standpoint of the handleability. In the case where the melt viscosity is in the range, a favorable handleability can be obtained while enhancing the adhesiveness of the conjugated diene-based rubber.

The melt viscosity of the conjugated diene-based rubber means a viscosity that is measured at 38° C. with a Brookfield viscometer (B type viscometer).

The glass transition temperature (Tg) of the conjugated diene-based rubber may vary depending on the vinyl content of the conjugated diene unit, the kind of the conjugated diene, the content of the unit derived from the additional monomer other than the conjugated diene, and the like, and is preferably −100 to 10° C., more preferably −100 to 0° C., further preferably −100 to −10° C. In the case where the Tg is in the range, the viscosity thereof can be prevented from being increased, so as to provide favorable handleability.

The vinyl content of the conjugated diene-based rubber is preferably 80% by mol or less, more preferably 50% by mol or less, and further preferably 30% by mol or less. In the case where the vinyl content is in the range, the adhesiveness can be enhanced.

In the description herein, the "vinyl content" means the total molar percentage of the conjugated diene units bonded via a 1,2-bond or a 3,4-bond (i.e., the conjugated diene units bonded via other than a 1,4-bond) in 100% by mol in total of the conjugated diene units contained in the modified liquid diene-based rubber. The vinyl content can be calculated by $^1$H-NMR from the integrated value ratio of the signal derived from the conjugated diene units bonded via a 1,2-bond or a 3,4-bond to the signal derived from the conjugated diene units bonded via a 1,4-bond.

[Oil]

The adhesive layer in the present invention may be formed, for example, by coating an adhesive component formed of a solution obtained by dissolving the conjugated diene-based rubber in an oil, on the surface-modified fibers.

In the present invention, for example, a so-called non-volatile oil having a vapor pressure at 20° C. of 10 Pa or less is preferably used. The use of the oil may prevent coating unevenness of the adhesive component to enhance the adhesiveness since the oil is not evaporated for a long period of time after coating the adhesive component on the surface of the fibers. Furthermore, the production equipments can be prevented from being contaminated in production. From these standpoints, the vapor pressure at 20° C. of the oil is preferably 8 Pa or less, more preferably 5 Pa or less, further preferably 1 Pa or less, still further preferably 0.1 Pa or less, and still more further preferably 0.01 Pa or less.

The vapor pressure at 20° C. of the oil in the present invention means a value that is calculated from a measured value obtained by the gas saturation method applied to the Antoine equation.

In the case where the oil is used in the present invention, the heat treatment for the resinification is not necessary as compared to the ordinary technique using RFL, and the evaporation step for removing water and the like is also not necessary as compared to the ordinary technique using a solvent, such as water, as a diluent. Accordingly, the production can be performed with a more convenient equipment more efficiently than the ordinary techniques, and is environmentally friendly.

The oil having a vapor pressure at 20° C. of 10 Pa or less that can be used in the present invention is not particularly limited, as far as the oil is compatible with the conjugated diene-based rubber, and examples thereof include a natural oil and a synthetic oil. Examples of the natural oil include a mineral oil and a vegetable oil.

Examples of the mineral oil include a paraffin-based mineral oil, an aromatic mineral oil, and a naphthene-based mineral oil, which are obtained by an ordinary refining method, such as solvent refining or hydrogenation refining, wax produced by the Fischer-Tropsch process (gas-to-liquid wax), and a mineral oil produced through isomerization of wax.

Examples of the commercially available product of the paraffin-based mineral oil include "Diana Process Oil" series, produced by Idemitsu Kosan Co., Ltd., and "Super Oil" series, produced by JX Energy Corporation.

Examples of the vegetable oil include linseed oil, camellia oil, macadamia nut oil, corn oil, mink oil, olive oil, avocado oil, sasanqua oil, caster oil, safflower oil, jojoba oil, sunflower seed oil, almond oil, canola oil, sesame oil, soybean oil, peanut oil, cotton seed oil, coconut oil, palm kernel oil, and rice bran oil.

Examples of the synthetic oil include a hydrocarbon-based synthetic oil, an ester-based synthetic oil, and an ether-based synthetic oil. Examples of the hydrocarbon-based synthetic oil include an $\alpha$-olefin oligomer, such as polybutene, polyisobutylene, a 1-octene oligomer, a 1-decene oligomer, and an ethylene-propylene copolymer, or a hydrogenated product thereof, an alkylbenzene, and an alkylnaphthalene. Examples of the ester-based synthetic oil include a triglycerin fatty acid ester, a diglycerin fatty acid ester, a monoglycerin fatty acid ester, a monoalcohol fatty acid ester, and a polyhydric alcohol fatty acid ester. Examples of the ether-based synthetic oil include a polyoxyalkylene glycol and a polyphenyl ether. Examples of the commercially available product of the synthetic oil include "Linealene" series, produced by Idemitsu Kosan Co., Ltd., and "FGC32", "FGC46", and "FGC68", produced by Anderol, Inc.

The oil may be either an oil using one kind selected from the natural oil and the synthetic oil described above, of an oil obtained by mixing two or more kinds of the natural oil, two or more kinds of the synthetic oil, or one or more kind each of the natural oil and the synthetic oil.

In the present invention, a mineral oil is preferred, and at least one kind selected from a paraffin-based mineral oil and a naphthene-based mineral oil is more preferred, from the standpoint of the regulation of the viscosity of the adhesive component to a suitable range for enhancing the workability.

The flash point of the oil used in the present invention is preferably 70° C. or more from the standpoint of the safety. From this standpoint, the flash point of the oil is more preferably 100° C. or more, further preferably 130° C. or more, and still further preferably 140° C. or more. The upper limit of the flash point of the oil is not particularly limited, and is preferably 320° C. or less.

The content of the conjugated diene-based rubber in the adhesive component is preferably 1% by mass or more, more preferably 5% by mass or more, and further preferably 10% by mass or more, and is preferably 80% by mass or less, more preferably 60% by mass or less, further preferably 50% by mass or less, and still further preferably 40% by mass or less, from the standpoint of the enhancement of the adhesion force to rubber. In the case where the content of the conjugated diene-based rubber in the adhesive component is in the range, the viscosity of the adhesive component can be prevented from becoming extremely high while providing a sufficient adhesion force.

The content of the oil in the adhesive component is preferably 20% by mass or more, more preferably 40% by mass or more, further preferably 50% by mass or more, and still further preferably 60% by mass or more, and is preferably 99% by mass or less, more preferably 95% by mass or less, and further preferably 90% by mass or less.

The mass ratio of the conjugated diene-based rubber and the oil [conjugated diene-based rubber (R)/oil (O)] in the adhesive component is preferably 0.1/9.9 to 8/2, more preferably 0.5/9.5 to 6/4, further preferably 1/9 to 5/5, and still further preferably 1/9 to 4/6. It has been generally known that an oil deteriorates adhesiveness of rubber, but the use of the conjugated diene-based rubber and the oil mixed in the aforementioned particular mass ratio can decrease the viscosity to enhance the handleability of the adhesive component, and can enhance the workability in attaching to the surface-modified fibers, while retaining the adhesiveness thereof.

In the present invention, the adhesive layer may be formed by attaching the adhesive component formed of an emulsion obtained by dispersing the conjugated diene-based rubber in water, to the surface-modified fibers.

In the case where the conjugated diene-based rubber is dispersed in water and used in the form of an oil-in-water emulsion, it is preferred that an emulsion (latex) of the adhesive component is prepared in advance by a mechanical method or a chemical method, and then diluted to provide a prescribed concentration before use.

Examples of the mechanical method include methods using a homogenizer, a homomixer, a disperser mixer, a colloid mill, a pipeline mixer, a high-pressure homogenizer, an ultrasonic emulsifier, and the like, which may be used alone or as a combination thereof.

Examples of the chemical method include various methods, such as an inverse emulsification method, a D-phase emulsification method, an HLB temperature emulsification method, a gel emulsification method, and a liquid crystal emulsification method, and an inverse emulsification method is preferred from the standpoint of the achievement of an emulsion having a fine particle diameter in a convenient manner. For providing an emulsion having a fine particle diameter, it may be preferred in some cases that the operation is performed under heating the system to an appropriate temperature (e.g., 30 to 80° C.) for the purpose of lowering the viscosity of the modified conjugated diene-based rubber.

In the case where the adhesive component is an emulsion, the content of the conjugated diene-based rubber in the adhesive component is preferably 0.5% by mass or more, more preferably 1% by mass or more, and further preferably 2% by mass or more, and is preferably 60% by mass or less, more preferably 40% by mass or less, further preferably 30% by mass or less, and still further preferably 20% by mass or less, from the standpoint of the enhancement of the adhesion force to rubber. In the case where the content of the conjugated diene-based rubber in the adhesive component is in the range, the viscosity of the adhesive component can be prevented from becoming extremely high while providing a sufficient adhesion force.

One kind of the conjugated diene-based rubber may be used alone, or two or more kinds thereof may be used in combination. One kind of the oil may be used alone, or two or more kinds thereof may be used in combination.

The adhesive component in the present invention may contain an additional component other than the conjugated diene-based rubber and the oil in such a range that does not impair the adhesion force to rubber.

Examples of the additional component include another polymer (such as unmodified conjugated diene-based rubber), an acid, an alkali, an antioxidant, a curing agent, a dispersant, a pigment, a dye, an adhesion aid, and carbon black.

In the case where the adhesive component contains the additional component, the content thereof is preferably 10,000 parts by mass or less, more preferably 1,000 parts by mass or less, further preferably 100 parts by mass or less, still further preferably 50 parts by mass or less, still more further preferably 25 parts by mass or less, and yet further preferably 10 parts by mass or less, per 100 parts by mass of the conjugated diene-based rubber.

[Production Method of Reinforcing Fibers]

The production method of the reinforcing fibers of the present invention is not particularly limited, and the reinforcing fibers can be produced by a method including a step of attaching the conjugated diene-based rubber and the oil in a mixed state to the fibers, or a step of attaching the conjugated diene-based rubber in a dispersed state in water to the fibers.

In the present invention, a method including a step of attaching the conjugated diene-based rubber and the oil in a mixed state to the fibers is preferred from the standpoint of the effective attachment of the conjugated diene-based rubber to the surface-modified fibers and the standpoint of the prevention of contamination of the production equipments.

Specific examples of the production method of the reinforcing fibers of the present invention include the following.

[Method (I)]

The method (I) is not particularly limited, as far as the method includes forming the adhesive layer formed of the adhesive component on the surface of the surface-modified fibers, and is preferably a method including the following step I-1 from the standpoint of the enhancement of the adhesiveness to rubber.

Step I-1: Step of Attaching the Adhesive Component to the Surface of the Surface-Modified Fibers In the step I-1, the method of attaching the adhesive component to the surface-modified fibers is not particularly limited, and examples thereof include a method of directly attaching the adhesive component, and a method of attaching the adhesive component after adding a solvent thereto depending on necessity.

The method of attaching the adhesive component is preferably performed by one or more kind selected from immersion, a roll coater, an oiling roller, an oiling guide, nozzle (spray) coating, brush coating, and the like.

The amount of the adhesive component attached is preferably 0.01 part by mass or more, more preferably 0.1 part by mass or more, and further preferably 1 part by mass or more, from the standpoint of the enhancement of the adhesiveness between the reinforcing fibers and rubber, and is preferably 10 parts by mass or less, more preferably 5 parts by mass or less, and further preferably 3 parts by mass or less, from the standpoint of the balance between the production cost and the effects, all per 100 parts by mass of the fiber used as the raw material.

In the case where the conjugated diene-based rubber and the particular oil are used in combination in the present invention, the reinforcing fibers of the present invention can be obtained by aging at room temperature of approximately 20° C. for approximately 3 to 10 days after attaching the adhesive component to the surface-modified fibers, and the following step I-2 may be performed in some cases.

Step I-2: Step of Subjecting the Surface-Modified Fibers Having the Adhesive Component Attached Thereto Obtained in the Step I-1 to a Heat Treatment The heat treatment in the step I-2 is preferably performed at a treatment temperature of 100 to 200° C. for a treatment time of 0.1 second to 2 minutes. The conjugated diene-based rubber contained in the adhesive component has a reactive multiple bond, and therefore the heat treatment in the presence of oxygen is preferably at 200° C. or less, and more preferably 175° C. or less. In the case where the temperature of the heat treatment is in the range, the adhesion force can be increased without reducing the amount of the reactive multiple bond in the conjugated diene-based rubber, and furthermore the fibers can be prevented from being deteriorated, so as to improve the quality, such as the coloration.

The reinforcing fibers may contain an additional component other than the surface-modified fibers and the adhesive component. Examples of the additional component include a crosslinking agent, an acid, a base, an inorganic salt, an organic salt, a pigment, a dye, an antioxidant, a polymerization initiator, and a plasticizer.

The total content of the hydrophilic fibers and the adhesive component in the reinforcing fibers is preferably 80% by mass or more, more preferably 90% by mass or more, and further preferably 95% by mass or more, from the standpoint of the enhancement of the adhesion force to rubber and the reinforcing strength.

<Physical Properties of Reinforcing Fibers>

The reinforcing fibers are preferably multifilaments that have a single fiber fineness of 0.1 dtex or more and 30 dtex or less. A single fiber fineness of less than 0.1 dtex may be allowed but is difficult to produce industrially, and therefore the single fiber fineness is preferably 0.1 dtex or more. In the case where the single fiber fineness is 30 dtex or less, the surface area of the fibers formed to be reinforcing fibers can be large to enhance the adhesiveness to rubber. From these standpoints, the reinforcing fibers of the present invention are preferably multifilaments that more preferably have a single fiber fineness of 0.3 dtex or more, further preferably 0.5 dtex or more, and still further preferably 1 dtex or more, and more preferably have a single fiber fineness of 20 dtex or less, further preferably 15 dtex or less, and still further preferably 10 dtex or less.

The rubber adhesion force of the reinforcing fibers of the present invention is preferably 30 N/25.4 mm or more, more preferably 50 N/25.4 mm or more, further preferably 70 N/25.4 mm or more, and still further preferably 80 N/25.4 mm or more, and is generally 200 N/25.4 mm or less. In the case where the rubber adhesion force of the reinforcing fibers is the lower limit value or more, a woven fabric, a knitted fabric, and a molded article excellent in reinforcing strength can be obtained.

The rubber adhesion force of the reinforcing fibers of the present invention is preferably 30 N/3 cords or more, more preferably 40 N/3 cords or more, further preferably 50 N/3 cords or more, and still further preferably 60 N/3 cords or more, and is generally 200 N/3 cords or less. In the case where the rubber adhesion force of the reinforcing fibers is the lower limit value or more, a woven fabric, a knitted fabric, and a molded article excellent in reinforcing strength can be obtained.

The rubber adhesion force of the reinforcing fibers can be measured by the method described in the examples.

The reinforcing fibers of the present invention can be used in any arbitrary form, and are preferably used in any form of a fiber cord, a woven fabric, a knitted fabric, and the like that each contain the reinforcing fibers at least partly therein, and more preferably in any form of a woven fabric and a knitted fabric that each contain the reinforcing fibers at least partly therein. For example, the reinforcing fibers can be used as a knitted fabric to be adhered to rubber as described hereinunder. The reinforcing fibers can also be used by being buried in a resin, cement, or the like.

[Molded Article]

The molded article of the present invention is not particularly limited, as far as the molded article uses the reinforcing fibers. A molded article having the reinforcing fibers and a rubber layer (which may be hereinafter referred to as a "rubber molded article") is preferred since the reinforcing fibers have excellent adhesiveness to rubber. The reinforcing fibers used in the rubber molded article are preferably in the form of a woven fabric or a knitted fabric containing the reinforcing fibers at least partly therein, and more preferably in the form of a laminate formed by laminating a reinforcing layer formed of a woven fabric or a knitted fabric containing the reinforcing fibers at least partly therein, and a rubber layer, from the standpoint of the retention of the form of rubber.

A preferred embodiment of the molded article of the present invention is a molded article that has the fibers, the surface-modifying layer, the adhesive layer, and the rubber layer in this order, and has an adhesion force between the adhesive layer and the rubber layer of 70 N or more, and more preferably 80 N or more, per 25.4 mm, and the molded article having the adhesion force that is 70 N or more can be favorably applied to the various purposes described later.

The rubber molded article can be used as a tire, such as an automobile tire, a belt, such as a conveyor belt and a timing belt, a hose, and a rubber product member, such as vibration absorbing rubber, and is more preferably used as a tire, a belt, and a hose among the above.

In the automobile tire, for example, the rubber molded article can be used for various members of a composite material formed of the reinforcing fibers and a rubber component, such as a belt, a carcass ply, a breaker, and a bead tape.

The hose can be used for the purpose of transporting various fluids in various purposes, and is favorable, for example, for a fluid transport hose for automobiles, and particularly favorably for a liquid fuel hose for automobiles, a brake oil hose for automobiles, and a refrigerant hose, and more favorably for a brake oil hose for automobiles.

The rubber molded article is preferably molded by using a rubber composition prepared by blending the reinforcing fibers and a rubber component blended with a compounding ingredient generally used in the rubber industry.

Examples of the rubber component are not particularly limited, and include NR (natural rubber), IR (polyisoprene rubber), BR (polybutadiene rubber), SBR (styrene-butadiene rubber), NBR (nitrile rubber), EPM (ethylene-propylene copolymer rubber), EPDM (ethylene-propylene-non-conjugated diene copolymer rubber), IIR (butyl rubber), halogenobutyl rubber, and CR (chloroprene rubber). Among these, NR, IR, BR, SBR, EPDM, and CR are preferably used, and EPDM is more preferably used. One kind of the rubber component may be used alone, or two or more kinds thereof may be used in combination. For use for a tire, rubber components that have been generally used in the tire industry may be used. Among these, natural rubber alone, or a combination of natural rubber and SBR is preferably used. In combining natural rubber and SBR, the mass ratio of natural rubber and SBR (natural rubber/SBR) is preferably in a range of 50/50 to 90/10 from the standpoint of the suppression of deterioration of the physical properties due to reversion of rubber.

Examples of the natural rubber include natural rubber and modified natural rubber, such as high-purity natural rubber, epoxidated natural rubber, hydroxylated natural rubber, hydrogenated natural rubber, and grafted natural rubber, that are generally used in the tire industry, for example, TSR (technically specified rubber) and RSS (ribbed smoked sheet), such as SMR (TSR from Malaysia), SIR (TSR from Indonesia), and STR (TSR from Thailand).

The SBR used may be any ordinary one generally used for tires, and specifically one having a styrene content of 0.1 to 70% by mass is preferred, one having a styrene content of 5 to 50% by mass is more preferred, and one having a styrene content of 15 to 35% by mass is further preferred. One having a vinyl content of 0.1 to 60% by mass is preferred, and one having a vinyl content of 0.1 to 55% by mass is more preferred.

The weight average molecular weight (Mw) of the SBR is preferably 100,000 to 2,500,000, more preferably 150,000 to 2,000,000, and further preferably 200,000 to 1,500,000. In the case where the weight average molecular weight is in the range, both the workability and the mechanical strength can be satisfied. The weight average molecular weight of the SBR is a polystyrene conversion weight average molecular weight that is measured by gel permeation chromatography (GPC).

The SBR used may also be modified SBR prepared by introducing a functional group into SBR within a range that does not impair the effects of the present invention. Examples of the functional group include an amino group, an alkoxysilyl group, a hydroxy group, an epoxy group, and a carboxy group.

The rubber composition may further contain a filler in addition to the rubber component. Examples of the filler include an inorganic filler, such as carbon black, silica, clay, mica, calcium carbonate, magnesium hydroxide, aluminum hydroxide, barium sulfate, titanium oxide, glass fibers, fibrous fillers, and glass balloons; and an organic filler, such as resin particles, wood powder, and cork powder. The filler contained in the rubber composition can improve the physical properties of the composition, such as the mechanical strength, the heat resistance, and the weather resistance, can control the hardness thereof, and can increase the amount of rubber.

In the fillers, carbon black and silica are preferred from the standpoint of the improvement of the physical properties, such as the enhancement of the mechanical strength.

Examples of the carbon black include furnace black, channel black, thermal black, acetylene black, and Ketjen black. Among these kinds of carbon black, furnace black is preferred from the standpoint of the enhancement of the crosslinking rate and the mechanical strength.

The average particle diameter of the carbon black is preferably 5 to 100 nm, more preferably 5 to 80 nm, and further preferably 5 to 70 nm. The average particle diameter of the carbon black can be determined by measuring the diameter of each particle with a transmission electron microscope and calculating the average value thereof.

Examples of the silica include wet process silica (hydrous silicic acid), dry process silica (silicic anhydride), calcium silicate, and aluminum silicate. Among these kinds of silica, wet process silica is preferred.

The average particle diameter of the silica is preferably 0.5 to 200 nm, more preferably 5 to 150 nm, and further preferably 10 to 100 nm.

The average particle diameter of the silica can be determined by measuring the diameter of each particle with a transmission electron microscope and calculating the average value thereof.

In the rubber composition, the filler content is preferably 20 to 150 parts by mass, more preferably 25 to 130 parts by mass, and further preferably 25 to 110 parts by mass, per 100 parts by mass of the rubber component.

In the case where a filler other than silica and carbon black is used as the filler, the content thereof is preferably 20 to 120 parts by mass, more preferably 20 to 90 parts by mass, and further preferably 20 to 80 parts by mass, per 100 parts by mass of the rubber component.

One kind of the filler may be used alone, or two or more kinds thereof may be used in combination.

The rubber composition may further contain a crosslinking agent for crosslinking the rubber component. Examples of the crosslinking agent include sulfur, a sulfur compound, oxygen, an organic peroxide, a phenol resin, an amino resin, a quinone and a quinone dioxime derivative, a halogen compound, an aldehyde compound, an alcohol compound, an epoxy compound, a metal halide and an organic metal halide compound, and a silane compound. One kind of the crosslinking agent may be used alone, or two or more kinds thereof may be used in combination. The crosslinking agent is generally contained in an amount of 0.1 to 10 parts by mass, more preferably 0.5 to 10 parts by mass, and further preferably 0.8 to 5 parts by mass, per 100 parts by mass of the rubber component, from the standpoint of the mechanical properties of the crosslinked product.

For example, in the case where the rubber composition contains sulfur or a sulfur compound as the crosslinking agent for crosslinking (vulcanizing) the rubber component, the rubber composition may further contain a vulcanization accelerator. Examples of the vulcanization accelerator include a guanidine-based compound, a sulfenamide-based compound, a thiazole-based compound, a thiuram-based compound, a thiourea-based compound, a dithiocarbamic acid-based compound, an aldehyde-amine-based compound, an aldehyde-ammonia-based compound, an imidazoline-based compound, and a xanthate-based compound. One kind of the vulcanization accelerator may be used alone, or two or more kinds thereof may be used in combination. The vulcanization accelerator is generally contained in an amount of 0.1 to 15 parts by mass, and preferably 0.1 to 10 parts by mass, per 100 parts by mass of the rubber component.

For example, in the case where the rubber composition contains sulfur or a sulfur compound as the crosslinking agent for crosslinking (vulcanizing) the rubber component, the composition may further contain a vulcanization aid. Examples of the vulcanization aid include a fatty acid, such as stearic acid, a metal oxide, such as zinc oxide, and a fatty acid metal salt, such as zinc stearate. One kind of the vulcanization aid may be used alone, or two or more kinds thereof may be used in combination. The vulcanization is generally contained in an amount of 0.1 to 15 parts by mass, and preferably 1 to 10 parts by mass, per 100 parts by mass of the rubber component.

In the case where the rubber composition contains silica as a filler, the rubber composition preferably further contains a silane coupling agent. Examples of the silane coupling agent include a sulfide-based compound, a mercapto-based compound, a vinyl-based compound, an amino-based compound, a glycidoxy-based compound, a nitro-based compound, and a chlorine-based compound.

One kind of the silane coupling agent may be used alone, or two or more kinds thereof may be used in combination. The silane coupling agent is preferably contained in an amount of 0.1 to 30 parts by mass, more preferably 0.5 to 20 parts by mass, and further preferably 1 to 15 parts by mass, per 100 parts by mass of silica. In the case where the content of the silane coupling agent is in the range, the dispersibility, the coupling effect, and the reinforcing performance can be improved.

The rubber composition may contain depending on necessity a process oil, such as a silicone oil, an aroma oil, TDAE (treated distilled aromatic extract), MES (mild extracted solvate), RAE (residual aromatic extract), a paraffin oil, and a naphthene oil, and a resin component, such as an aliphatic hydrocarbon resin, an alicyclic hydrocarbon resin, a C9-based resin, a rosin-based resin, a coumarone-indene-based resin, and a phenol-based resin, as a softening agent for the purpose of improving the workability, the fluidity, and the like, in such a range that does not impair the effects of the present invention. In the case where the rubber composition contains the process oil as the softening agent, the content thereof is preferably less than 50 parts by mass per 100 parts by mass of the rubber component.

The rubber composition may contain depending on necessity an additive, such as an antiaging agent, wax, an antioxidant, a lubricant, a light stabilizer, a scorching inhibitor, a working aid, a colorant, such as a pigment and a dye, a flame retardant, an antistatic agent, a delustering agent, an antiblocking agent, a UV absorbent, a mold release agent, a foaming agent, an antimicrobial agent, an antifungal agent, and a fragrance, in such a range that does not impair the effects of the present invention, for the purpose of improving the weather resistance, the heat resistance, and the oxidation resistance. Examples of the antioxidant include a hindered phenol-based compound, a phosphorus-based compound, a lactone-based compound, and a hydroxy-based compound. Examples of the antiaging agent include an amine-ketone-based compound, an imidazole-based compound, an amine-based compound, a phenol-based compound, a sulfur-based compound, and a phosphorus-based compound. One kind of the additives may be used alone, or two or more kinds thereof may be used in combination.

As for the production method for the rubber molded article, for example, the reinforcing fibers are buried in the rubber composition before vulcanization, and then the rubber composition is vulcanized to provide a molded article including the surface-modified fibers and the rubber component bonded via the adhesive component.

Example of the brake oil hose for automobiles include one having an inner rubber layer and an outer rubber layer with one or two reinforcing layers containing the reinforcing fibers intervening between the inner rubber layer and the outer rubber layer.

Examples of the rubber component constituting the inner rubber layer and the outer rubber layer include those described above. Among the above, examples of the rubber component constituting the inner rubber layer include EPDM and SBR, and examples of the rubber component constituting the outer rubber layer include EPDM and CR. The reinforcing layer may be formed by knitting and braiding the reinforcing fibers.

As for the production method for the brake oil hose, a reinforcing layer (first reinforcing layer) formed by knitting and braiding the reinforcing fibers is formed on the outer surface of the inner rubber layer. In the case where two reinforcing layers are formed, an intermediate rubber layer is further formed on the outer surface of the first reinforcing layer, and another reinforcing layer (second reinforcing layer) formed by knitting and braiding the reinforcing fibers may be formed on the outer surface of the intermediate rubber layer. An outer rubber layer is then formed on the outer surface of the reinforcing layer (first reinforcing layer or second reinforcing layer), and vulcanized to provide the intended brake oil hose.

The vulcanization temperature can be appropriately selected depending on the kind of the constituent materials for each layer of the brake oil hose, and is preferably 200° C. or less from the standpoint of the suppression of the deterioration of the rubber and the reinforcing fibers and the enhancement of the adhesion force between the rubber and the reinforcing fibers.

EXAMPLES

The present invention will be described more specifically with reference to examples and the like, but the present invention is not restricted by the examples.
<Production of Modified Conjugated Diene-based Rubber>
Production of Modified Conjugated Diene-Based Rubber Having Monomer Unit Represented by Following Formula (1a)

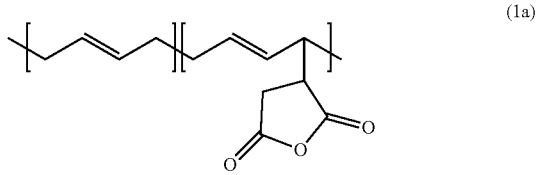

(1a)

Production Example 1

Production of Modified Conjugated Diene-Based Rubber (A-1)

A sufficiently dried 5 L autoclave was purged with nitrogen, to which 756 g of hexane and 122.3 g of n-butyllithium (17% by mass hexane solution) were charged and heated to 50° C., and then 1,344 g of butadiene was sequentially added thereto and polymerized for 1 hour while controlling the polymerization temperature to 50° C. under stirring. Thereafter, methanol was added to terminate the polymerization reaction to provide a polymer solution. The resulting polymerization solution was washed with water by adding water thereto, followed by stirring. After completing the stirring and confirming that the polymer solution phase and the water phase were separated to each other, water was isolated. The polymer solution after completing the washing was dried in vacuum at 70° C. for 24 hours, so as to provide an unmodified liquid polybutadiene (A'-1).

Subsequently, 600 g of the resulting unmodified liquid polybutadiene (A'-1) was charged in a 1 L autoclave purged with nitrogen, and 30 g of maleic anhydride and 0.6 g of N-phenyl-N'-(1,3-dimethylbutyl)-p-phenylenediamine (product name "Nocrac 6C", produced by Ouchi Shinko Chemical Industrial, Co., Ltd.) were added thereto and reacted at 170° C. for 24 hours, so as to provide maleic anhydride-modified liquid polybutadiene (A-1).

Production Example 2

Production of Modified Conjugated Diene-based Rubber (A-2)

A sufficiently dried 5 L autoclave was purged with nitrogen, to which 1,260 g of hexane and 36.3 g of n-butyllithium (17% by mass hexane solution) were charged and heated to 50° C., and then 1,260 g of butadiene was sequentially added thereto and polymerized for 1 hour while controlling the polymerization temperature to 50° C. under stirring. Thereafter, methanol was added to terminate the polymerization reaction to provide a polymer solution. The resulting polymerization solution was washed with water by adding water thereto, followed by stirring. After completing the stirring and confirming that the polymer solution phase and the water phase were separated to each other, water was isolated. The polymer solution after completing the washing was dried in vacuum at 70° C. for 24 hours, so as to provide an unmodified liquid polybutadiene (A'-2).

Subsequently, 500 g of the resulting unmodified liquid polybutadiene (A'-2) was charged in a 1 L autoclave purged with nitrogen, and 25 g of maleic anhydride and 0.5 g of N-phenyl-N'-(1,3-dimethylbutyl)-p-phenylenediamine (product name "Nocrac 6C", produced by Ouchi Shinko Chemical Industrial, Co., Ltd.) were added thereto and reacted at 170° C. for 24 hours, so as to provide maleic anhydride-modified liquid polybutadiene (A-2).

Production Example 3

Production of Modified Conjugated Diene-based Rubber (A-3)

A sufficiently dried 5 L autoclave was purged with nitrogen, to which 1,140 g of hexane and 20.9 g of n-butyllithium (17% by mass hexane solution) were charged and heated to 50° C., and then 1,390 g of butadiene was sequentially added thereto and polymerized for 1 hour while controlling the polymerization temperature to 50° C. under stirring. Thereafter, methanol was added to terminate the polymerization reaction to provide a polymer solution. The resulting polymerization solution was washed with water by adding water thereto, followed by stirring. After completing the stirring and confirming that the polymer solution phase and the water phase were separated to each other, water was isolated. The polymer solution after completing the washing was dried in vacuum at 70° C. for 24 hours, so as to provide an unmodified liquid polybutadiene (A'-3).

Subsequently, 500 g of the resulting unmodified liquid polybutadiene (A'-3) was charged in a 1 L autoclave purged with nitrogen, and 25 g of maleic anhydride and 0.5 g of N-phenyl-N'-(1,3-dimethylbutyl)-p-phenylenediamine (product name "Nocrac 6C", produced by Ouchi Shinko Chemical Industrial, Co., Ltd.) were added thereto and reacted at 170° C. for 24 hours, so as to provide maleic anhydride-modified liquid polybutadiene (A-3).

Production Example 4

Production of Modified Conjugated Diene-based Rubber (A-4)

9.0 g of methanol was added to 525 g of the resulting maleic anhydride-modified liquid polybutathene (A-3), and reacted at 80° C. for 6 hours, so as to provide monomethyl maleate-modified liquid polybutadiene (A-4).

Production Example 5

Production of Modified Conjugated Diene-based Rubber (A-5)

8.5 g of methanol was added to 525 g of the resulting maleic anhydride-modified liquid polybutathene (A-2), and reacted at 80° C. for 6 hours, so as to provide monomethyl maleate-modified liquid polybutadiene (A-5).

The measurement methods and the calculation methods of the physical properties of the modified conjugated diene-based rubbers were as follows. The results are shown in Table 1.

<Measurement Method of Weight Average Molecular Weight, Number Average Molecular Weight, and Molecular Weight Distribution>

The weight average molecular weight (Mw), the number average molecular weight (Mn), and the molecular weight distribution (Mw/Mn) of the modified conjugated diene-based rubber were obtained as standard polystyrene conversion values by GPC (gel permeation chromatography). The apparatus and the condition for the measurement were as follows.

Apparatus: GPC apparatus "GPC8020", produced by Tosoh Corporation
Separation column: "TSKgel G4000HXL", produced by Tosoh Corporation
Detector: "RI-8020" from Tosoh Corporation
Eluent: Tetrahydrofuran
Eluent flow rate: 1.0 mL/min
Sample concentration: 5 mg/10 mL
Column temperature: 40° C.

<Measurement Method of Melt Viscosity>

The melt viscosity at 38° C. of the modified conjugated diene-based rubber was measured with a Brookfield viscometer (produced by Brookfield Engineering Labs. Inc.).

<Measurement Method of Glass Transition Temperature>

10 mg of the modified conjugated diene-based rubber was collected on an aluminum pan and measured for thermogram under a heating rate condition of 10° C./min with a differential scanning calorimeter (DSC), and the value of the peak top of DDSC was designated as the glass transition temperature.

<Measurement Method of Vinyl Content>

The vinyl content of the modified conjugated diene-based rubber was measured by $^1$H-NMR (500 MHz), produced by JEOL, Ltd., at a concentration of sample/deuterated chloroform=50 mg/1 mL and a cumulative number of 1,024. The vinyl content was calculated from the area ratio of the peak of the double bond derived from the vinylated diene compound and the peak of the double bond derived from the non-vinylated diene compound in the resulting spectrum.

<Average Number of Hydrogen Bonding Functional Group in One Molecule>

The average number of the hydrogen bonding functional group per one molecule of the modified conjugated diene-based rubber was calculated from the equivalent (g/eq) of the hydrogen bonding functional group of the modified conjugated diene-based rubber and the styrene conversion number average molecular weight Mn thereof, according to the following expression.

Average number of hydrogen bonding functional group per one molecule=[(number average molecular weight (Mn))/(molecular weight of styrene unit)×(average molecular weight of conjugated diene and additional monomer unit contained depending on necessity other than conjugated diene)]/(equivalent of hydrogen bonding functional group)

The method for calculating the equivalent of the hydrogen bonding functional group may be appropriately selected depending on the kind of the hydrogen bonding functional group.

The average number of the hydrogen bonding functional group per one molecule of each of the maleic anhydride-modified conjugated diene-based rubber and the monomethyl maleate-modified conjugated diene-based rubber was calculated by determining the acid value of the maleic anhydride-modified conjugated diene-based rubber or the monomethyl maleate-modified conjugated diene-based rubber, and calculating the equivalent (g/eq) of the hydrogen bonding functional group from the acid value.

A sample after subjecting to the modification reaction was washed four times with methanol (5 mL per 1 g of the sample) to remove the impurities, such as antioxidant, and then the sample was dried under reduced pressure at 80° C. for 12 hours. 180 mL of toluene and 20 mL of ethanol were added to 3 g of the sample after subjecting to the modification reaction for dissolving the sample, and then the solution was subjected to neutralization titration with a 0.1 N ethanol solution of potassium hydroxide to determine the acid value thereof according to the following expression.

Acid Value (mgKOH/g)=$(A-B) \times F \times 5.611/S$

A: Dropwise addition amount (mL) of 0.1 N ethanol solution of potassium hydroxide needed for neutralization
B: Dropwise addition amount (mL) of 0.1 N ethanol solution of potassium hydroxide for blank test without sample
F: Titer of 0.1 N ethanol solution of potassium hydroxide
S: Mass (g) of weighed sample The mass of the hydrogen bonding functional group contained in 1 g of each of the maleic anhydride-modified conjugated diene-based rubber and the monomethyl maleate-modified conjugated diene-based rubber was calculated, and the mass except for the functional group (i.e., the mass of the polymer main chain) contained in 1 g of each of the maleic anhydride-modified conjugated diene-based rubber and the monomethyl maleate-modified conjugated diene-based rubber was calculated, from the acid value according to the following expression. The equivalent of the hydrogen bonding functional group (g/eq) was then calculated according to the following expression.

[Mass of hydrogen bonding functional group per 1 g]=[acid value]/[56.11]×[molecular weight of hydrogen bonding functional group]/1000

[Mass of polymer main chain per 1 g]=1−[mass of hydrogen bonding functional group per 1 g]

[Equivalent of hydrogen bonding functional group]= [mass of polymer main chain per 1 g]/([mass of hydrogen bonding functional group per 1 g]/ [molecular weight of hydrogen bonding functional group])

TABLE 1

| Modified polybutadiene | Modifying group | Mw (×10³) | Mn (×10³) | Molecular weight distribution Mw/Mn | Melt viscosity at 38° C. (Pa · s) | Glass transition temperature (° C.) | Vinyl content (% by mol) | Average number of functional group per one molecule (piece) |
|---|---|---|---|---|---|---|---|---|
| A-1 | maleic anhydride group | 9 | 9 | 1.10 | 3 | −89 | 11 | 3 |

TABLE 1-continued

| Modified polybutadiene | Modifying group | Mw (×10³) | Mn (×10³) | Molecular weight distribution Mw/Mn | Melt viscosity at 38° C. (Pa · s) | Glass transition temperature (° C.) | Vinyl content (% by mol) | Average number of functional group per one molecule (piece) |
|---|---|---|---|---|---|---|---|---|
| A-2 | maleic anhydride group | 29 | 27 | 1.07 | 95 | −89 | 10 | 7 |
| A-3 | maleic anhydride group | 47 | 41 | 1.15 | 828 | −89 | 10 | 12 |
| A-4 | monomethyl maleate group | 52 | 45 | 1.14 | 2016 | −87 | 10 | 11 |
| A-5 | monomethyl maleate group | 31 | 29 | 1.07 | 197 | −88 | 10 | 7 |

<Constitutional Material of Surface-Modifying Layer (Surface Modifier)>

The constitutional materials (surface modifiers B-1 to B-9) of the surface-modifying layer were prepared by mixing the components according to the formulations shown in Table 2.

TABLE 2

| | Composition | Part by mass |
|---|---|---|
| B-1 | water | 96.96 |
| | blocked isocyanate compound | 2.29 |
| | epoxy compound | 0.75 |
| B-2 | water | 95.43 |
| | blocked isocyanate compound | 3.44 |
| | epoxy compound | 1.13 |
| B-3 | water | 92 |
| | oxazoline group-containing compound | 8 |
| B-4 | water | 95 |
| | carbodiimide group-containing compound | 5 |
| B-5 | water | 99.24 |
| | blocked isocyanate compound | 0.57 |
| | epoxy compound | 0.19 |
| B-6 | water | 99.5 |
| | ethyleneimine compound | 0.5 |
| B-7 | water | 99 |
| | epoxy compound | 1 |
| B-8 | water | 94.29 |
| | sodium acrylate compound | 5.71 |
| B-9 | water | 97.5 |
| | diamide type cationic compound | 2.5 |

The details of the compounds shown in Table 2 are as follows.
Blocked Isocyanate Compound
  Meikanate DM-3031 CONC (pure content: 54% by mass, produced by Meisei Chemical Works, Ltd.)
Epoxy Compound
  Denacol EX-614B" (pure content: 100% by mass, produced by Nagase ChemteX Corporation)
Oxazoline Group-Containing Compound
  Epocros WS-700 (pure content: 25% by mass, produced by Nippon Shokubai Co., Ltd.)
Carbodiimide Group-Containing Compound
  Carbodilite Prototype (pure content: 40% by mass, produced by Nisshinbo Chemical Inc.)
Sodium Acrylate Compound
  Aqualic DL-453 (pure content: 35% by mass, produced by Nippon Shokubai Co., Ltd.)
Ethyleneimine Compound
  Epomin SP-200 (pure content: 100% by mass, produced by Nippon Shokubai Co., Ltd.)
Diamide Type Cationic Compound
  Adekamine SF-201 (pure content: 80% by mass, produced by Adeka Corporation)

<Diluted Solution of Conjugated Diene-Based Rubber>

The modified conjugated diene rubber shown in Table 1 was diluted with a fatty acid ester or a mineral oil to prepare a diluted solution of 25% by mass.

The fatty acid ester used was a polyol fatty acid ester (trimethylolpropane tricaprylate) and had a vapor pressure at 20° C. of $1.7 \times 10^{-7}$ Pa and a flash point of 258° C. having no volatility. The mineral oil used had a vapor pressure at 20° C. of $7.0 \times 10^{-3}$ Pa and a flash point of 158° C. having no volatility.

Example 1

PET fibers (total fineness: 1,100 dtex, single fiber fineness: 6.10 dtex) as polyester-based fibers were immersed in the surface modifier (B-1) and then squeezed with a roller.

Thereafter, the resulting fibers were subjected to a drying treatment at 140° C. for 60 seconds and then subjected to a heat treatment at 240° C. for 60 seconds, so as to produce surface-modified fibers.

Subsequently, a diluted solution of the modified conjugated diene-based rubber was prepared to make the composition and the attached amount shown in Table 3, and applied to the surface-modified fibers with an oiling guide, and the fibers were wound. Thereafter, the fibers were aged at room temperature (20° C.) for 3 days and then twisted at a twist count of 80 T/m to produce reinforcing fibers.

Examples 2 to 7 and Comparative Examples 1 to 4

Reinforcing fibers were produced in the same manner as in Example 1 except that the surface-modifying layer, the adhesive layer, and the attached amounts thereof were changed as shown in Table 3.

Reference Example 1

PET fibers (total fineness: 1,100 dtex, single fiber fineness: 6.10 dtex) as polyester-based fibers were immersed in the pretreatment liquid described later, which was then attached by squeezing with a roller, and were subjected to a drying treatment at 140° C. for 60 seconds and then subjected to a heat treatment at 240° C. for 60 seconds.

Subsequently, RFL was applied thereto, and then the fibers were subjected to a drying treatment at 140° C. for 60 seconds and then subjected to a heat treatment at 240° C. for 60 seconds, so as to provide treated thread. The treated thread was twisted at a twist count of 80 T/m to produce reinforcing fibers. The pretreatment liquid and the RFL liquid used were prepared in the following manner.

[Preparation of RFL Pretreatment Liquid]

| Water | 96.96 parts by mass |
|---|---|
| Blocked isocyanate | 2.29 parts by mass |
| Epoxy compound | 0.75 part by mass |

The pretreatment liquid was prepared by using a blocked isocyanate and an epoxy resin. The blocked isocyanate used was "Meikanate DM-3031 CONC", produced by Meisei Chemical Works, Ltd., and the epoxy resin used was Denacol EX-614B", produced by Nagase ChemteX Corporation.

[Preparation of RFL Liquid]

| Liquid A | |
|---|---|
| Water | 524 parts by mass |
| Resorcinol | 15 parts by mass |
| Formaldehyde (effective amount: 37% by mass) | 16 parts by mass |
| Sodium hydroxide aqueous solution (effective amount: 10% by mass) | 4 parts by mass |

The liquid A was aged at a temperature of 25° C. for 6 hours.

| Liquid B | |
|---|---|
| SBR latex (effective amount: 40% by mass) | 207 parts by mass |
| Vinylpyridine-modified SBR latex (effective amount: 40% by mass) | 233 parts by mass |

The liquid B and the aged liquid A were mixed and then aged at a temperature of 25° C. for 16 hours to produce an RFL liquid.

<Measurement of Zeta Potential>

The zeta potential of the fiber surface of the surface-modified fibers obtained in each of Examples 1 to 7 and Comparative Examples 1 to 4 was measured with a zeta potential particle diameter measurement system ELSZ-1000 (produced by Otsuka Electronics Co., Ltd.) at pH=7 and a temperature of 25° C. with a cell for flat plates.

Specifically, the fibers were arranged in a cell for flat plate tightly with no gap, and a dispersion liquid having monitor particles (polystyrene particles coated with hydroxypropyl cellulose (produced by Otsuka Electronics Co., Ltd.)) dispersed in a 10 mM sodium chloride (NaCl) aqueous solution was injected to the cell for flat plate. The electrophoresis was performed under condition of an applied voltage of 80 V.

<Measurement of Adhesion Force Between Reinforcing Fibers and EPDM Rubber>

A sheet for evaluation was produced in the following manner for the reinforcing fibers obtained in each of Examples 1 to 7, Comparative Examples 1 to 4, and Reference Example 1, and measured for the force (N/25.4 mm) required for T-peeling of the reinforcing fibers from the rubber, which was designated as the rubber adhesion force. The results are shown in Table 3.

In the evaluation results of the rubber adhesion force, a larger value means a larger adhesion force between the reinforcing fibers and the rubber. The sheet for adhesion was produced in the following manner.

[Production of Sheet for Evaluation]

The reinforcing fibers produced in each of Examples, Comparative Examples, and Reference Example were arranged in the form of blind curtain without overlap of the reinforcing fibers on a masking tape, and by using the reinforcing fibers and EPDM rubber, an unvulcanized rubber composition prepared with the following blending composition was placed thereon. Subsequently, the assembly was press-vulcanized under condition of 150° C. and a pressure of 20 kg/cm$^2$ for 30 minutes to produce a sheet for evaluation.

[Blending Composition of EPDM Unvulcanized Rubber>

| EPDM rubber | 100 parts by mass |
|---|---|
| Filler (carbon black) | 60 parts by mass |
| Softening agent (paraffin-based process oil) | 20 parts by mass |
| Crosslinking agent (sulfur powder) | 1.5 parts by mass |
| Vulcanization aid (two kinds of zinc oxide and stearic acid) | 6 parts by mass |
| Vulcanization accelerator (thiazole-based and thiuram-based) | 1.5 parts by mass |

TABLE 3

| | | | Surface-modifying layer | | Adhesive layer | | Attached amount per 100 parts by mass of fibers (part by mass) | | Adhesion force |
|---|---|---|---|---|---|---|---|---|---|
| | | Fibers | Treatment liquid | Surface zeta potential after treatment (mV) | Conjugated diene-based rubber | Diluting oil | Surface-modifying Sayer | Adhesive Sayer | (N/25.4 mm) EPDM as adherend |
| Example | 1 | polyester | B-1 | −2.8 | A-2 | fatty acid ester | 0.16 | 1.38 | 85.8 |
| | 2 | polyester | B-1 | −2.8 | A-3 | fatty acid ester | 0.16 | 1.57 | 80.4 |
| | 3 | polyester | B-3 | 5.2 | A-3 | fatty acid ester | 0.17 | 1.48 | 74.2 |
| | 4 | polyester | B-1 | −2.8 | A-3 | mineral oil | 0.16 | 1.49 | 82.6 |
| | 5 | polyester | B-1 | −2.8 | A-1 | fatty acid ester | 0.16 | 1.22 | 80.9 |
| | 6 | polyester | B-1 | −2.8 | A-4 | fatty acid ester | 0.16 | 1.81 | 147.7 |
| | 7 | polyester | B-5 | −18.5 | A-2 | fatty acid ester | 0.05 | 1.82 | 71.3 |
| Comparative Example | 1 | polyester | none | −60.1 | A-3 | fatty acid ester | — | 1.40 | 4.9 |
| | 2 | polyester | B-7 | −25.0 | A-4 | fatty acid ester | 0.09 | 1.77 | 32.6 |
| | 3 | polyester | B-8 | −24.5 | A-4 | fatty acid ester | 0.18 | 1.80 | 4.9 |
| | 4 | polyester | B-9 | 39.2 | A-4 | fatty acid ester | 0.19 | 1.82 | 4.2 |
| Reference Example | 1 | polyester | | | RFL | | | | 81.9 |

Examples 8 to 16 and Comparative Examples 5 to 10

Reinforcing fibers were produced in the same manner as in Example 1 except that the fibers, the surface-modifying layer, the adhesive layer, and the attached amounts thereof were changed as shown in Table 4. The fiber species used were nylon fibers (total fineness: 1,100 dtex, single fiber fineness: 6.10 dtex) as polyamide-based fibers and vinylon fibers (total fineness: 1,330 dtex, single fiber fineness: 6.65 dtex, "Kuralon 1239", produced by Kuraray Co., Ltd.) as polyamide-based fibers, in addition to the polyester fibers.

Reference Example 2

Reinforcing fibers were produced in the same manner as in Reference Example 1 except that the fibers were not finally twisted.

<Measurement of Adhesion Force between Reinforcing Fibers and NR/SBR Rubber>

A sheet for evaluation was produced in the following manner for the reinforcing fibers obtained in each of Examples 8 to 16, Comparative Examples 5 to 10, and Reference Example 2, and measured for the force (N/25.4 mm) required for T-peeling of the reinforcing fibers from the rubber, which was designated as the rubber adhesion force. The results are shown in Table 4. In the evaluation results of the rubber adhesion force, a larger value means a larger adhesion force between the reinforcing fibers and the rubber. The sheet for adhesion was produced in the following manner.

[Production of Sheet for Evaluation]

The reinforcing fibers produced in each of Examples, Comparative Examples, and Reference Example were arranged in the form of blind curtain without overlap of the reinforcing fibers on a masking tape, and by using the reinforcing fibers and NR/SBR rubber, an unvulcanized rubber composition prepared with the following blending composition was placed thereon. Subsequently, the assembly was press-vulcanized under condition of 150° C. and a pressure of 20 kg/cm² for 30 minutes to produce a sheet for evaluation.

[Blending Composition of NR/SBR Unvulcanized Rubber>

| | |
|---|---|
| NR rubber | 70 parts by mass |
| SBR rubber | 41.25 parts by mass |
| Filler (carbon black) | 45 parts by mass |
| Vulcanizing agent (sulfur powder) | 3.5 parts by mass |
| Vulcanization aid (zinc oxide and stearic acid) | 6 parts by mass |
| Vulcanization accelerator (thiazole-based) | 1 part by mass |

TABLE 4

| | | | Surface-modifying layer | | Adhesive layer | | Attached amount per 100 parts by mass of fibers (part by mass) | | Adhesion force |
|---|---|---|---|---|---|---|---|---|---|
| | | Fibers | Treatment liquid | Surface zeta potential after treatment (mV) | Conjugated diene-based rubber | Diluting oil | Surface-modifying layer | Adhesive layer | (N/25.4 mm) NR/SBR as adherend |
| Example | 8 | polyester | B-2 | 8.5 | A-2 | fatty acid ester | 0.23 | 1.38 | 75.0 |
| | 9 | polyester | B-1 | −2.8 | A-3 | fatty acid ester | 0.16 | 1.57 | 113.9 |
| | 10 | polyester | B-3 | 5.2 | A-3 | fatty acid ester | 0.17 | 1.52 | 75.1 |
| | 11 | polyester | B-1 | −2.8 | A-3 | mineral oil | 0.16 | 1.49 | 110.8 |
| | 12 | polyester | B-1 | −2.8 | A-4 | fatty acid ester | 0.16 | 1.77 | 119.5 |
| | 13 | polyester | B-4 | −0.7 | A-4 | fatty acid ester | 0.18 | 1.66 | 79.4 |
| | 14 | polyester | B-5 | −18.5 | A-3 | fatty acid ester | 0.05 | 1.82 | 73.2 |
| | 15 | vinylon | B-1 | −9.8 | A-2 | fatty acid ester | 0.29 | 1.79 | 78.8 |
| | 16 | nylon | B-6 | 26.2 | A-2 | fatty acid ester | 0.21 | 1.77 | 75.2 |
| Comparative Example | 5 | polyester | none | −60.1 | A-3 | fatty acid ester | — | 1.40 | 6.1 |
| | 6 | vinylon | none | −26.1 | A-2 | fatty acid ester | — | 1.83 | 44.1 |
| | 7 | nylon | none | −61.9 | A-2 | fatty acid ester | — | 1.64 | 4.2 |
| | 8 | polyester | B-5 | −25.0 | A-4 | fatty acid ester | 0.09 | 1.77 | 28.9 |
| | 9 | polyester | B-6 | −24.5 | A-4 | fatty acid ester | 0.18 | 1.80 | 9.2 |
| | 10 | polyester | B-7 | 39.2 | A-4 | fatty acid ester | 0.19 | 1.82 | 5.1 |
| Reference Example 2 | | polyester | | | | RFL | | | 85.1 |

Example 17: Treatment Method of Twisted Cord

Two PET fibers (total fineness: 1,100 dtex, single fiber fineness: 6.10 dtex) as polyester-based fibers were twisted in a number of primary twist of 470 per meter and a number of final twist of 470 per meter, so as to produce a twisted fiber cord.

The twisted fiber cord was immersed in the surface modifier (B-1) and then squeezed with a roller. The resulting fiber cord was subjected to a drying treatment at 140° C. for 60 seconds and then subjected to a heat treatment at 240° C. for 60 seconds. Subsequently, the fiber cord was immersed in an emulsion composition containing the modified conjugated diene-based rubber shown in Table 5 as a major component and then squeezed with a roller, and the fiber cord was subjected to a drying treatment at 140° C. for 60 seconds and then wound. The content of the modified conjugated diene-based rubber in the emulsion composition was 10% by mass.

Examples 18 and 19 and Comparative Example 11

Reinforcing fibers were produced in the same manner as in Example 17 except that the surface-modifying layer, the adhesive layer, and the attached amounts thereof were changed as shown in Table 5.

Reference Example 3

Reinforcing fibers were produced in the same manner as in Reference Example 1 except that the twisted PET fiber cord was used.

<Measurement of Rubber Adhesion Force>

A specimen for evaluation was produced in the following manner for the reinforcing fibers obtained in each of Examples 17 to 19, Comparative Example 11, and Reference Example 3, and measured for the force (N/3 cords) required for T-peeling of the reinforcing fibers from the rubber, which was designated as the rubber adhesion force. The results are shown in Table 5. In the evaluation results of the rubber adhesion force, a larger value means a larger adhesion force between the reinforcing fibers and the rubber. The specimen for adhesion was produced in the following manner.

<Production of Specimen for Evaluation>

Three cords of the reinforcing fibers produced in each of Examples, Comparative Examples, and Reference Example were arranged with a regular interval on the NR/SBR unvulcanized rubber prepared according to the aforementioned formulation. Subsequently, the assembly was press-vulcanized under condition of 150° C. and a pressure of 20 kg/cm$^2$ for 30 minutes to produce a specimen for evaluation.

TABLE 5

| | | Surface-modifying layer | | Adhesive layer | | Attached amount per 100 parts by mass of fibers (part by mass) | | Adhesion force |
|---|---|---|---|---|---|---|---|---|
| | Fibers | Treatment liquid | Surface zeta potential after treatment (mV) | Conjugated diene-based rubber | Diluting | Surface-modifying layer | Adhesive layer | (N/3 cords) NR/SBR as adherend |
| Example 17 | polyester | B-1 | −2.8 | A-4 | water (emulsion) | 0.33 | 2.97 | 82.3 |
| Example 18 | polyester | B-3 | 5.2 | A-4 | water (emulsion) | 0.41 | 2.89 | 69.2 |
| Example 19 | polyester | B-1 | −2.8 | A-5 | water (emulsion) | 0.33 | 2.78 | 64.7 |
| Comparative Example 11 | polyester | none | −60.1 | A-4 | water (emulsion) | — | 3.36 | 5.4 |
| Reference Example 3 | polyester | | | RFL | | | | 54.3 |

As apparent from the results of Examples and Comparative Examples, the present invention can provide surface-modified fibers and reinforcing fibers that are excellent in adhesiveness to rubber. In particular, according to the present invention, fibers and rubber can be firmly adhered without the use of an adhesive containing a resorcinol-formaldehyde resin and a rubber latex as major components.

The invention claimed is:

1. Reinforcing fibers, comprising:
   surface-modified fibers containing fibers and a surface-modifying layer that covers at least a part of a surface of the fibers and has a surface with a solid surface zeta potential of −20.0 to 30.0 mV, and
   an adhesive layer containing conjugated diene-based rubber that covers at least a part of a surface of the surface-modified fibers and has a number average molecular weight (Mn) of more than 2,000 and 120,000 or less.

2. The reinforcing fibers according to claim 1, wherein the conjugated diene-based rubber has a monomer unit derived from one or more dienes selected from the group consisting of butadiene, isoprene, and farnesene, in a molecule thereof.

3. The reinforcing fibers according to claim 1, wherein
   the conjugated diene-based rubber is modified conjugated diene-based rubber comprising a hydrogen bonding functional group in a part of the conjugated diene-based rubber, and
   the hydrogen bonding functional group is one or more groups selected from the group consisting of a hydroxy group, an epoxy group, an aldehyde group, an acetalized form of an aldehyde group, a carboxy group, a salt of a carboxy group, an esterified form of a carboxy group, an acid anhydride of a carboxy group, a silanol group, an esterified form of a silanol group, an amino group, an imidazole group, and a mercapto group.

4. The reinforcing fibers according to claim 1, wherein the adhesive layer further contains an oil, and the oil has a vapor pressure at 20° C. of 10 Pa or less.

5. A molded article, comprising the reinforcing fibers according to claim 1.

6. The molded article according to claim 5, further comprising a rubber layer.

7. The molded article according to claim 5, wherein the molded article is a tire, a belt, or a hose.

8. A molded article, comprising fibers, a surface-modifying layer, an adhesive layer, and a rubber layer in this order, wherein an adhesion force between the adhesive layer and the rubber layer is 70 N or more per a width of 25.4 mm.

9. The reinforcing fibers according to claim 1, wherein the fibers are one or more fibers selected from the group consisting of polyester-based fibers, polyamide-based fibers, polyvinyl alcohol-based fibers, and regenerated cellulose-based fibers.

10. The reinforcing fibers according to claim 1, wherein the surface-modifying layer contains a compound comprising a nitrogen-containing functional group.

11. The reinforcing fibers according to claim 1, wherein the surface-modifying layer contains a compound comprising a functional group derived from one or more groups selected from the group consisting of an oxazoline group, an oxazolidinone group, a carbodiimide group, a carbamide group, an amino group, and an aziridine group.

12. The reinforcing fibers according to claim 1, wherein an amount of the surface-modifying layer is 0.01 to 5.0 parts by mass per 100 parts by mass of the fibers used as a raw material.

* * * * *